(12) United States Patent
Kitamura

(10) Patent No.: US 6,874,894 B2
(45) Date of Patent: Apr. 5, 2005

(54) DMD EQUIPPED PROJECTOR

(75) Inventor: Takatoyo Kitamura, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 10/652,234

(22) Filed: Sep. 2, 2003

(65) Prior Publication Data

US 2004/0041988 A1 Mar. 4, 2004

(30) Foreign Application Priority Data

Sep. 2, 2002 (JP) .................................. 2002-005543 U

(51) Int. Cl.[7] .......................... G03B 21/14; G02F 1/00; H04N 5/74
(52) U.S. Cl. .......................... 353/97; 353/38; 348/771
(58) Field of Search .............................. 353/30, 31, 33, 353/34, 37, 49, 50, 52, 88, 89, 97, 98, 99, 102, 122, 38, 119, 60, 55, 56; 348/770, 771; 359/212, 223, 224

(56) References Cited

U.S. PATENT DOCUMENTS

| | | | | |
|---|---|---|---|---|
| 5,633,755 A | * | 5/1997 | Manabe et al. ............. | 359/443 |
| 5,743,612 A | * | 4/1998 | Matsuda et al. ............ | 353/97 |
| 5,924,783 A | * | 7/1999 | Jones ......................... | 353/97 |
| 6,155,687 A | * | 12/2000 | Peterson ..................... | 353/84 |
| 6,637,894 B2 | * | 10/2003 | Dewald et al. .............. | 353/97 |
| 6,652,105 B1 | * | 11/2003 | Peterson et al. ............. | 353/98 |
| 2002/0051094 A1 | * | 5/2002 | Makita ....................... | 348/744 |

FOREIGN PATENT DOCUMENTS

| | | |
|---|---|---|
| JP | 2000-206452 | 7/2000 |
| JP | 2000-258703 | 9/2000 |
| JP | 2000-321529 | 11/2000 |
| JP | 2002-107822 | 4/2002 |

* cited by examiner

Primary Examiner—Judy Nguyen
Assistant Examiner—Andrew Sever
(74) Attorney, Agent, or Firm—Crowell & Moring LLP

(57) ABSTRACT

A DMD stop has a notch through which a light reflected towards other than a projection lens by a mirror unit can pass. This protects the DMD from being heated up and thermally fractured by the light reflected towards other than the projection lens by the mirror unit.

12 Claims, 5 Drawing Sheets

DMD EQUIPPED PROJECTOR

BACKGROUND OF THE INVENTION

The present invention relates to a projector equipped with a DMD (digital micro-mirror device).

A projector is provided where an image is generated by an image display device receiving an image data from a personal computer or a video camera and projected on a screen. The projector hence includes an optical system for projection of images.

Such an optical image projection system has a known construction shown in FIG. 6. A beam of light emitted from a lamp 116 is passed through a lens 151, rendered coloring by a color wheel 119, passed through a lens 152, and projected on a DMD 113. As the light is reflected on an image generating surface of the DMD 113, it generates an optical image which is then magnified by the action of a projection lens 105 to generate a visible image 154 on a screen 153.

For reducing its size, the optical image projection system may have an optical device known as a light tunnel or a reflecting mirror provided on the light path. FIG. 7 illustrates an example of such a type of the optical image projection system where a beam of light emitted from a lamp 116 is received by a filter 118 to remove its ultraviolet and infrared components. The light is then rendered coloring by a color wheel 119 and passed through a light tunnel 120. The light tunnel 120 allows the light received at one end to be repeatedly reflected in a short optical path before released from the other end, and generates a uniform light. The light tunnel 120 hence contributes to the reduction of the light path length, and makes the optical image projection system compact in the dimensions. The light through the light tunnel 120 is then corrected in the wavelength by a tablet lens 115 and reflected on a reflecting mirror 114. The reflecting mirror 114 allows the light from the lamp 116 to be reflected and directed towards the DMD 112 as its light path is bent. This causes the optical image projection system to be more decreased in the overall size. The light reflected by the reflecting mirror 114 is then converged on the DMD 112 by the action of a relay lens 161. The converged area is confined to the mirror surface of the DMD 112 by the action of a black aluminum stop 113 (referred to as a DMD stop hereinafter).

The reason why the convergence of the light has to be confined to the mirror surface of the DMD 112 by the DMD stop 113 is explained below. In common, an area wider than the mirror surface of the DMD 112 is irradiated by the light from the relay lens 161 towards the DMD 112. If the convergence of the light is not confined by the DMD stop 113, a reflected light from other surfaces than the mirror surface may enter the projection lens 105 and interrupt the projected image. Also, the DMD 112 may entirely be heated up by the converged light.

One of the prior arts is disclosed in Japanese Patent Publication No. 2000-258703 (referred to as a first prior art hereinafter). Its projector is designed for generating a projected image at high contrast with no ghost effect, where a prism is installed between the DMD and the projection lens. The prism passes a light directed towards the projection lens by a DMD mirror unit, but reflects a light directed towards other than the projection lens by the DMD mirror unit. Thus the light reflected towards other than the projection lens by the DMD mirror unit is inhibited from entering the projection lens.

Another prior art is disclosed in Japanese Patent Publication No. 2002-107822 (referred to as a second prior art hereinafter). Its projector is arranged with its projection lens having both curved surfaces modified such that the DMD entering light fluxes of which the incident angle is substantially equal in the absolute value to but different in the sign from the normal light can be held in a not-converging state on the screen, hence preventing the light from the DMD from reflecting on the surface of the projection lens and entering again the DMD to generate a ghost effect in the projected image.

A further prior art is disclosed in Japanese Patent Publication No. 2000-206452 (referred to as a third prior art hereinafter). Its projector is designed for narrowing the flux of light at the entrance pupil of the projection lens to improve the luminance of the projected image on the screen with using no complex lens system. In the projector a condenser lens is installed between the color prism and the DMD.

A still further prior art is disclosed in Japanese Patent Laid-open Publications 2000-321529 (referred to as a fourth prior art hereinafter). Its projector is arranged with a plurality of small-power light sources for illumination on the DMD at higher efficiency. In the projector, rays of light from the plural light sources are combined by a fly-eye lens to a uniform luminance light.

However, the convention projector with the above described optical projection system shown in FIG. 7 has a drawback that as the intensity of light directed from the lamp 116 via the reflecting mirror 114 and the relay lens 161 to the DMD 112 is significantly high, a light reflected towards other than a projection lens 105 by a DMD mirror unit 131 shown in FIG. 8 reaches as a dispersed light the projection lens 105 regardless of the use of the DMD stop 113. Also, the light reflected towards other than the projection lens 105 by the DMD mirror unit 131 may heat up the DMD stop 113 and cause its thermal fracture. Moreover, while the DMD stop 113 is made of an aluminum sheet and has its surfaces anodized having a black color, its opening 113b shown in FIG. 8 is provided by cutting out the anodized aluminum sheet, thus causing the edge side 113a at the opening 113b to be exposed as of not anodized aluminum. This permits the light reflected towards other than the projection lens 105 by the DMD mirror unit 131 and the reflected light 142 from other surfaces than the DMD mirror unit 131 to be mirror reflected on the exposed edge side 113a and then reach the projection lens 105 thus declining the contrast in the projected image.

The first to fourth prior arts also fail to eliminate the foregoing drawback.

SUMMARY OF THE INVENTION

It is an object of the present invention to provide a DMD equipped projector which can protect a DMD stop from being heated up and thermally fractured by the light reflected towards other than a projection lens by a mirror unit and can improve contrast in the projected image.

A DMD equipped projector in accordance with an aspect of the present invention comprises; a DMD (digital micromirror device) for generating an optical image based on a beam of light emitted by a light source and an image signal input from the outside; a projection lens for projecting the optical image generated by the DMD; a DMD stop provided between the DMD and the projection lens for protecting the DMD from receiving optical heat;

The DMD includes a mirror unit consisting mainly of an array of deformable mirror elements, each of whose reflection angle is changeable between an angle for reflecting an incident light from the light source in a first direction towards the projection lens and another angle for reflecting the incident light from the light source in a second direction different from the first direction;

The DMD stop has an opening through which the incident light from the light source passes, and a notch through which the light directed in the second direction passes.

The above arrangement has the notch of the DMD stop provided for passing the light reflected towards other than the projection lens by the mirror unit and protecting the surface of the DMD stop opposite to the DMD from being exposed to the reflection of light. Accordingly, the DMD stop can be protected from being heated up and thermally fractured by the light reflected towards other than the projection lens by the mirror unit.

Simultaneously, the light reflected towards other than the projection lens by the mirror unit can be inhibited from reflecting on the edge side at the opening of the DMD stop and reaching the projection lens. As the result, the contrast in the projected image can be improved.

DETAILED DESCRIPTION OF THE PREFERRED EMBODIMENT

Figure 1:
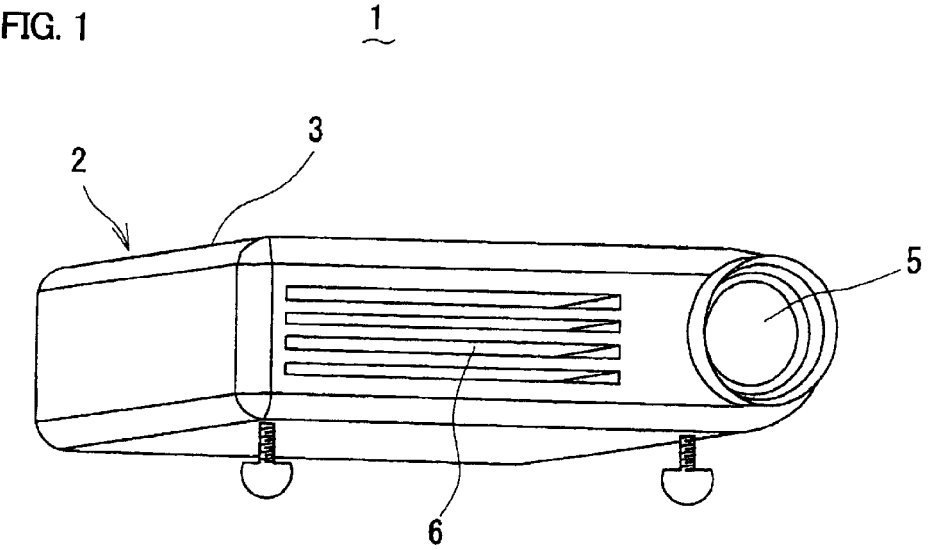
FIG. 1 is a perspective external view of a projector according to the present invention.

One embodiment of the present invention will be described referring to the relevant drawings. FIG. 1 is an external view of a projector of the embodiment. The projector denoted by 1 is designed for generating an image from image data received from a personal computer or a video camera and projecting it on the screen or the like. The projector 1 includes a projection lens 5 mounted to the front side of a housing 3 of its main body 2 for projecting an image and an air outlet 6 provided in the front side of the same for discharging the air used for cooling a lamp in the main body 2 to the outside of the main body 2.

Figure 2:
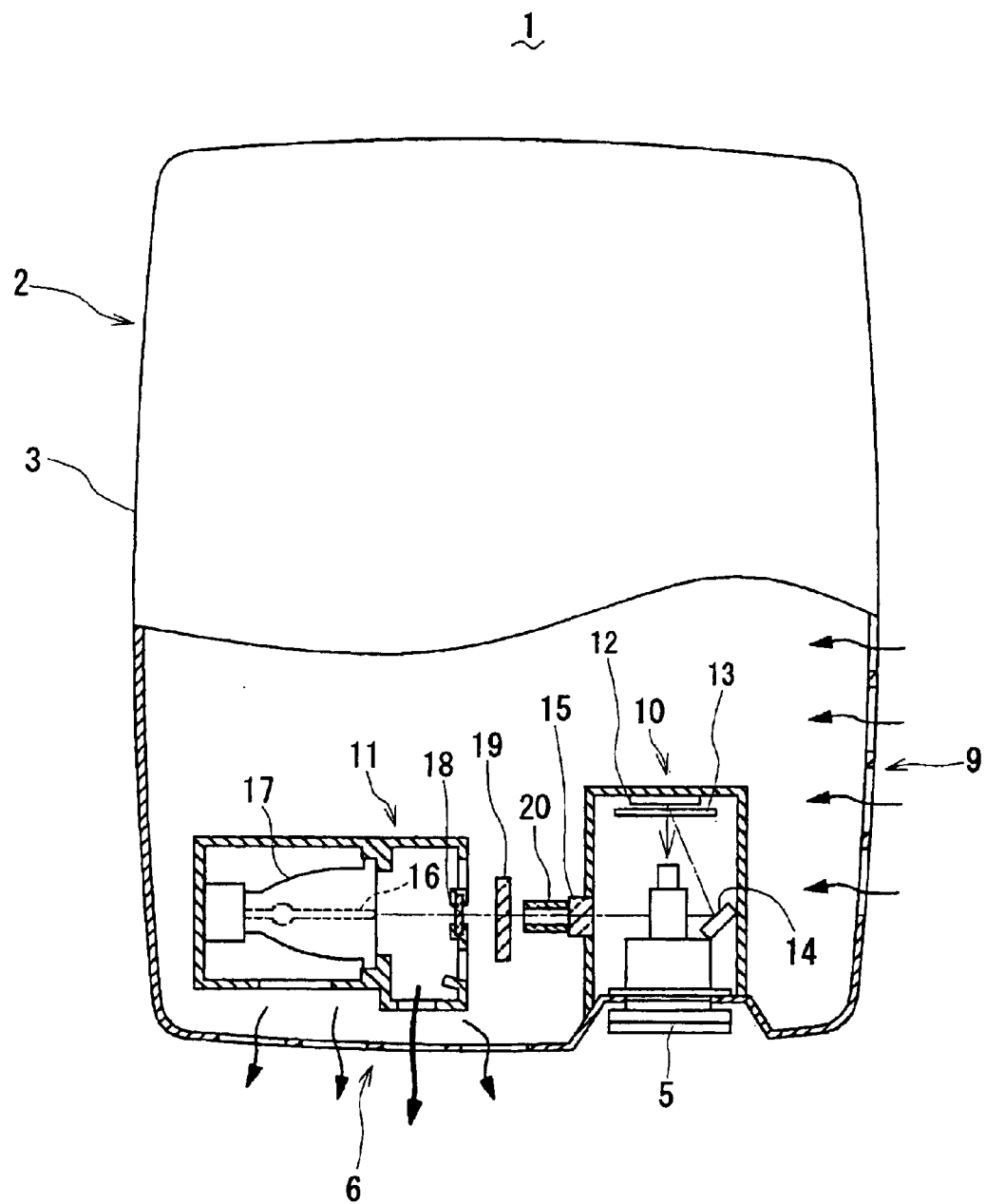
FIG. 2 is a partially broken plan view showing an internal arrangement of the projector.

The internal arrangement of the projector 1 will now be explained in more detail referring to FIG. 2. The housing 3 of the main body 2 contains a lamp box 11 and a casting engine 10 for projecting an optical image using light emitted from the lamp 16 installed in the lamp box 11. The lamp box 11 contains the lamp 16 as a light source, a lamp reflector 17 for reflecting and converging light emitted from the lamp 16, and a cut filter 18 for removing infrared and ultraviolet components from the light reflected by the reflector 17. The casting engine 10 comprises a tablet lens 15 for correcting unwanted effects on the wavelength of the light which reaches the engine 10, a reflecting mirror 14 for reflecting the light from the tablet lens 15, a DMD (digital micromirror device) 12 for generating an optical image using the light reflected by the reflecting mirror 14, and the projection lens 5 for projecting the optical image generated by the DMD 12. Also, the casting engine 10 has a DMD stop 13 provided between the DMD 12 and the projection lens 5 for protecting the DMD 12 from optical heat. Moreover, an optical tunnel 20 having four glass plates joined together to a tubular form and a color wheel 19 for color separation are provided between the lamp box 11 and the casting engine 10.

Figure 3:
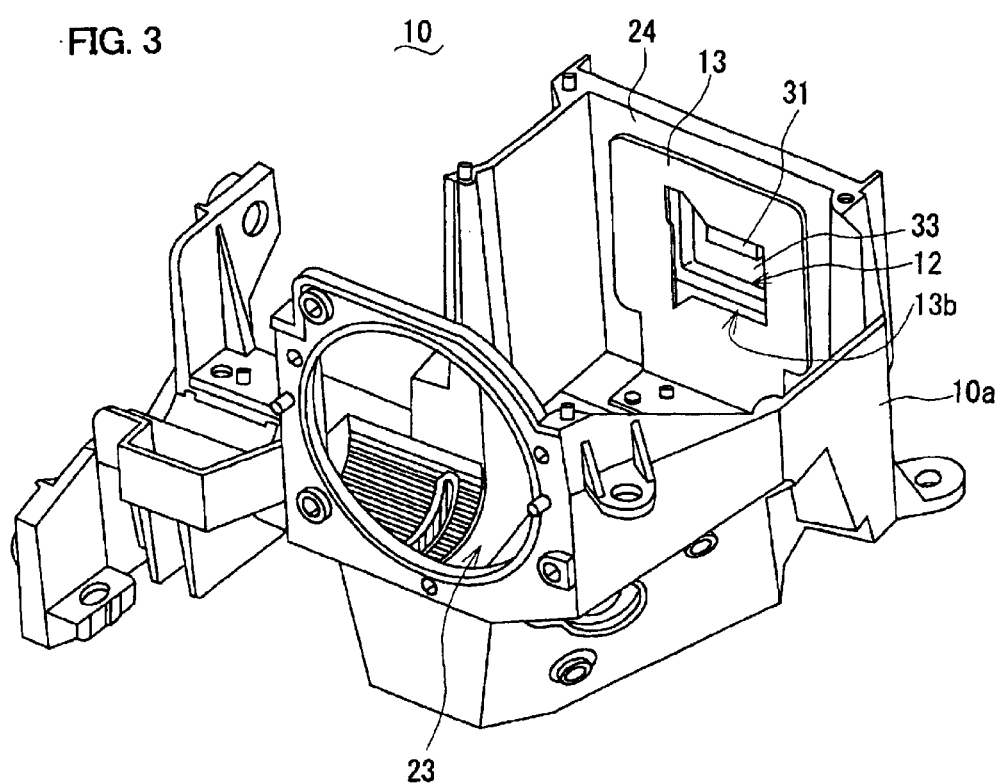
FIG. 3 is a perspective view showing a DMD and a DMD stop mounted to the body of a casting engine in the projector.

The DMD 12 and the DMD stop 13 will be described in more detail referring to FIGS. 3 and 4. FIG. 3 illustrates the casting engine 10 before equipped with primary components of the optical system including the lens and the mirror. The DMD 12 is mounted on the surface 24 of the casting engine 10 which is located opposite to a projection lens installation opening 23 provided in the front side of the body 10a of the casting engine 10. The DMD stop 13 is located between the DMD 12 and the projection lens installation opening 23 and adjacent to the DMD 12.

Figure 4:
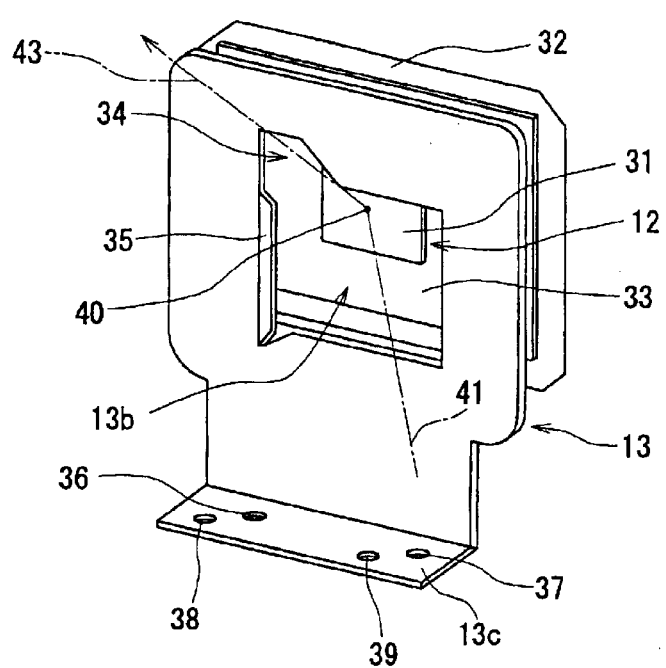
FIG. 4 illustrates an arrangement of the DMD and the DMD stop.

As shown in FIGS. 3 and 4, the DMD 12 comprises a DMD mirror unit 31 having an array of deformable mirror elements, a glass cover 33 for protecting the DMD mirror unit 31, and a DMD holder 32 holding the DMD 12 and the glass cover 33. Each of the deformable mirror elements in the DMD mirror unit 31 is arranged responsive to an image signal received from the outside, and a reflection angle of each of the deformable mirror elements is changeable between an angle for reflecting an incident light 41 from the lamp 16 via the reflecting mirror 14 towards the projection lens 5 and another angle for reflecting the incident light 41 towards other than the projection lens 5. An mirror element 40 shown in FIG. 4 is at the angle for reflecting the incident light 41 towards other than the projection lens 5.

Figure 5:
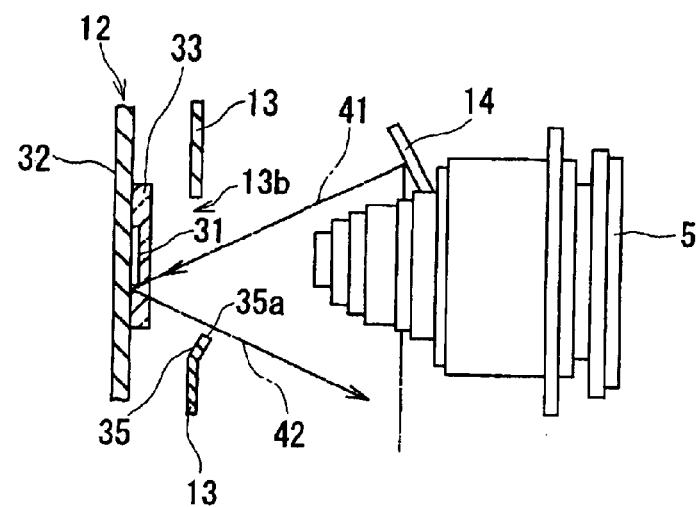
FIG. 5 is an explanatory view of a scheme for inhibiting the reflection of light from other surfaces than the DMD mirror unit from reaching a projection lens.
Figure 6:
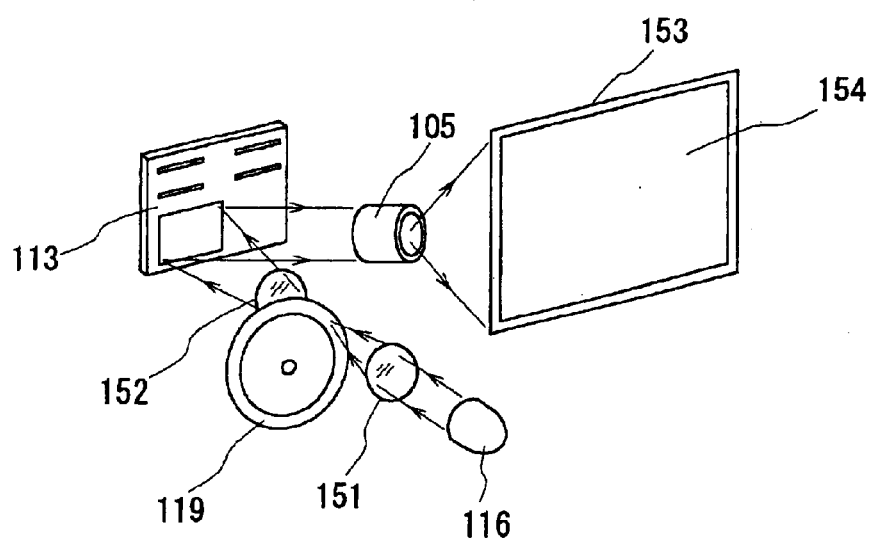
FIG. 6 is a perspective view of a conventional optical image projection system.
Figure 7:
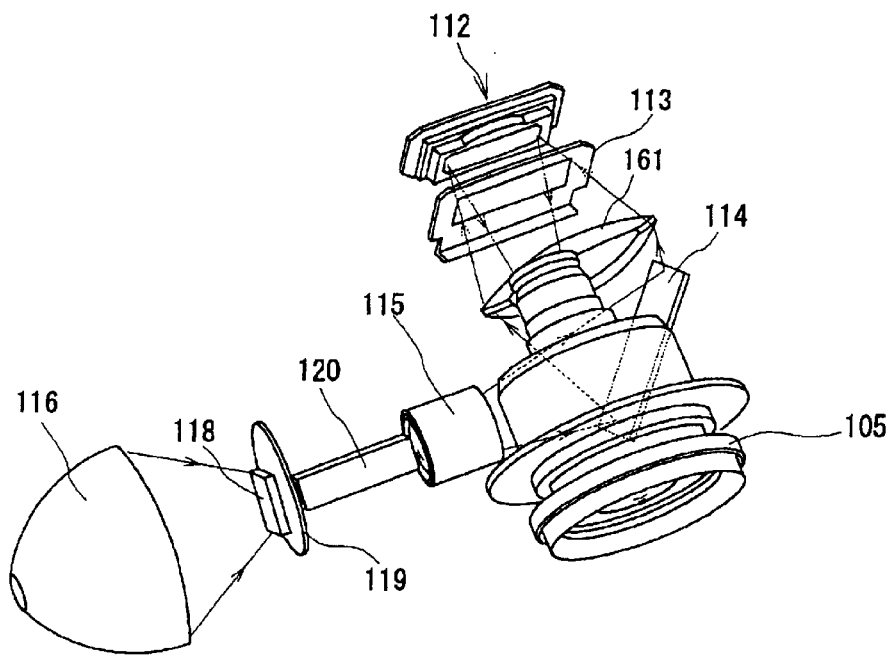
FIG. 7 is a perspective view of an optical image projection system with a reflecting mirror in a conventional projector.
Figure 8:
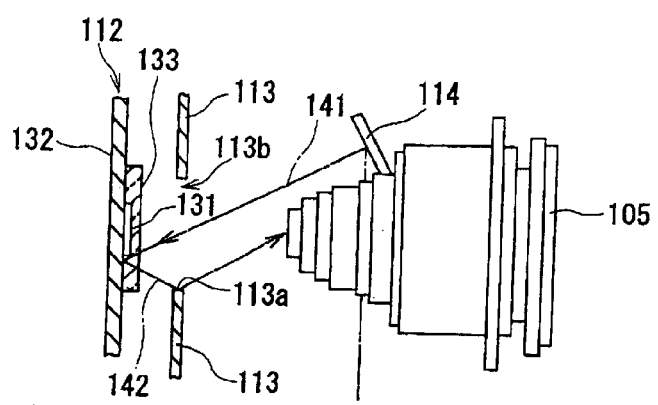
FIG. 8 illustrates the light reflected by other surfaces than the DMD mirror unit reaching the projection lens in the conventional projector.

Also as shown in FIG. 4, the DMD stop 13 has an opening 13b for passing the light 41, which is emitted from the lamp 16 and reaches the DMD 12 via the reflecting mirror 14, to the DMD mirror unit 31, and a stop notch 34 provided continuously at the opening 13b for passing the light 43 reflected towards other than the projection lens 5 by the mirror elements 40. The DMD stop 13 has a bent portion 35 formed by bending a portion near the opening 13b of the DMD stop 13 towards the projection lens 5 to be orthogonal to the light path of the reflected light 42 (See FIG. 5) from other surfaces than the DMD mirror unit 31 against the incident light 41 to the DMD 12. Moreover, the DMD stop 13 has a mounting portion 13c thereof provided for mounting to the body 10a of the casting engine 10 (See FIG. 3) as shown in FIG. 4. The mounting portion 13c has holes 36 and 37 provided therein for engaging with corresponding projections, not shown, formed on the body 10a of the casting engine 10 to determine the position of the DMD stop 13 and holes 38 and 39 provided therein for anchoring the DMD stop 13 by unshown screws to the body 10a of the casting engine 10. The material of the DMD stop 13 is an aluminum sheet anodized to tint a color of black and then blast finished to have the surfaces roughened. The opening 13b and the stop notch 34 of the DMD stop 13 are provided by punching the aluminum sheet.

The features of the projector 1 for preventing thermal fracture of the DMD stop 13 and improving contrast in the projected image will now be explained. When the light 43 reflected towards other than the projection lens 5 by the mirror element 40 shown in FIG. 4 reaches the surface opposite to the DMD 12 of the DMD stop 13, it may heat up the DMD stop 13 and cause its thermal fracture. As the projector 1 has the stop notch 34 for passing the light 43 reflected towards other than the projection lens 5 by the mirror elements 40, it allows the light 43 to pass the stop notch 34 but not irradiate the surface opposite to the DMD 12 of the DMD stop 13. Accordingly, the DMD stop 13 can be protected from being heated up and thermally fractured by the light 43 reflected towards other than the projection lens 5 by the mirror elements 40. Simultaneously, the light 43 reflected towards other than the projection lens 5 by the mirror elements 40 can be inhibited from reflecting on the edge side at the opening of the DMD stop 13 and reaching the projection lens.

Also, the projector 1 has the DMD stop 13 provided at the opening 13b with the bent portion 35 bent towards the projection lens 5. By the bent portion 35 the reflected light 42 from the other surfaces than the DMD mirror unit 31 against the incident light 41 to the DMD 12 can pass, so that an edge side 35a of the bent portion 35 is extended in substantially parallel with the reflected light 42. This inhibits the reflected light 42 from reflecting on the edge side 35a of the bent portion 35 and reaching the projection lens 5. Accordingly, the contract in the projected image can be improved.

The present invention is not limited to the embodiment but may be implemented by various modifications. For example, while the DMD stop has a notch provided near the opening thereof in the embodiment, it may have another notch or opening for clearing the light path not adjacent to the opening along which the light reflected by the black pixel mirrors is passed. Although the bent portion of the DMD stop provided near the opening by bending towards the projection lens in the embodiment so that its edge side is extended in substantially parallel to the light reflected by the other surfaces than the mirror unit to protect the projection lens from receiving the reflected light, it may be replaced by a second notch provided at the location of the bent portion in the DMD stop and arranged with its edge side extending in substantially parallel with the reflected light from the other surfaces than the mirror unit for inhibiting the reflected light from reaching the projection lens.

This application is based on Japanese utility model application No. 2002-5543 filed in Japan dated on Sep. 2, 2002, the contents of which are hereby incorporated by references.

What is claimed is:

1. A DMD equipped projector comprising;
    a DMD (digital micro-mirror device) for generating an optical image based on a beam of light emitted by a light source and an image signal input from the outside;
    a projection lens for projecting the optical image generated by the DMD;
    a DMD stop provided between the DMD and the projection lens for protecting the DMD from receiving optical heat; wherein
    the DMD includes a mirror unit consisting mainly of an array of deformable mirror elements, each of whose reflection angles is changeable between an angle for reflecting an incident light from the light source in a first direction towards the projection lens and another angle for reflecting the incident light from the light source in a second direction different from the first direction;
    the DMD stop has an opening through which the incident light from the light source passes, and a notch through which the light directed in the second direction passes.

2. The DMD equipped projector according to claim 1, wherein the notch in the DMD stop is formed by cutting a portion near the opening of the DMD stop.

3. The DMD equipped projector according to claim 2, wherein the DMD stop is arranged in a manner so that an edge side of an opening of the DMD stop is extended in substantially parallel with the light reflected by surfaces of the mirror unit except the deformable mirror elements.

4. The DMD equipped projector according to claim 3, wherein the DMD stop has a bent portion by which the reflected light from the other surfaces than the mirror unit can pass when the light from the light source is incident on the DMD.

5. The DMD equipped projector according to claim 4, wherein the bent portion of the DMD stop is formed by bending a portion near the opening of the DMD stop towards the projection lens.

6. The DMD equipped projector according to claim 3, wherein the DMD stop is arranged in a manner so that an edge side of the opening of the DMD stop is cut to be extended in substantially parallel with the light reflected by the other surfaces than the mirror unit.

7. The DMD equipped projector according to claim 1, wherein the DMD stop is arranged in a manner so that an edge side of the opening of the DMD stop is extended in substantially parallel with the light reflected by surfaces of the mirror unit except the deformable mirror elements.

8. The DMD equipped projector according to claim 7, wherein the DMD stop has a bent portion by which the reflected light from the other surfaces than the mirror unit can pass when the light from the light source is incident on the DMD.

9. The DMD equipped projector according to claim 8, wherein the bent portion of the DMD stop is formed by bending a portion near the opening of the DMD stop towards the projection lens.

10. The DMD equipped projector according to claim 9, wherein the bent portion of the DMD stop is arranged in a manner so that an edge side of the bent portion is extended in substantially parallel with the light reflected by the other surfaces than the mirror unit.

11. The DMD equipped projector according to claim 7, wherein the bent portion of the DMD stop is arranged in a manner so that an edge side of the bent portion is extended in substantially parallel with the light reflected by the other surfaces than the mirror unit.

12. The DMD equipped projector according to claim 7, wherein the DMD stop is arranged in a manner so that an edge side of the opening of the DMD stop is cut to be extended in substantially parallel with the light reflected by the other surfaces than the mirror unit.

* * * * *